US006374182B2

(12) United States Patent
Bechtolsheim et al.

(10) Patent No.: US 6,374,182 B2
(45) Date of Patent: *Apr. 16, 2002

(54) METHOD AND SYSTEM FOR PROVIDING WALKING INSTRUCTIONS WITH ROUTE GUIDANCE IN A NAVIGATION PROGRAM

(75) Inventors: Stephan V. Bechtolsheim, Buffalo Grove; John M. Jaugilas, Lombard; Roy Casino, Palos Hills; Matthew Friederich, Berwyn; Srinivasa Doddapaneni, Chicago; Shiva Kalisetty, Lisle; Richard J. Weiland, Evanston, all of IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/814,447

(22) Filed: Mar. 22, 2001

Related U.S. Application Data

(63) Continuation of application No. 09/234,154, filed on Jan. 19, 1999, now Pat. No. 6,208,934.

(51) Int. Cl.[7] .......................... G01C 21/30; G01C 21/32
(52) U.S. Cl. .......................... 701/209; 701/23; 701/200; 701/206; 701/207; 701/208; 340/988
(58) Field of Search .......................... 701/23, 25, 200, 701/201, 202, 207, 208, 209, 211, 212, 213, 214; 340/988, 990, 995; 73/178 R

(56) References Cited

U.S. PATENT DOCUMENTS

| 5,537,324 A | 7/1996 | Nimura et al. |
| 5,559,707 A | 9/1996 | DeLorme et al. |
| 5,568,390 A | 10/1996 | Hirota et al. |
| 5,893,898 A | 4/1999 | Tanimoto |
| 5,953,722 A | 9/1999 | Lampert et al. |
| 6,034,626 A | 3/2000 | Maekawa et al. |
| 6,119,065 A | 9/2000 | Shimada et al. |
| 6,208,934 B1 * | 3/2001 | Bechtolsheim et al. ...... 701/209 |

FOREIGN PATENT DOCUMENTS

| DE | 3006141 A | 10/1981 |
| DE | 19743371 A | 4/1998 |
| EP | 0772174 A | 5/1997 |
| JP | 07057188 A | 3/1995 |

* cited by examiner

Primary Examiner—Gertrude Arthur
(74) Attorney, Agent, or Firm—Frank J. Kozak; Lawrence M. Kaplan

(57) ABSTRACT

A system and method are disclosed that provide an end user of a navigation program with information about walking to a desired destination in combination with information about driving to or close to the desired destination. In addition to the calculation of a route for driving to the desired destination, the navigation program uses data in a geographic database to calculate one or more routes to reach the desired destination by walking from locations within a walking threshold around the desired destination. In calculating these one or more walking routes, the navigation program uses the data in the geographic database to assess the suitability of roads around the desired destination for pedestrian travel. In calculating these one or more walking routes, the navigation program can also include road segments in the walking routes without regard for travel restrictions that only apply to vehicular traffic. Additionally, if the navigation program is installed in a vehicle, the navigation program may indicate the walking distance to the desired destination along one of the calculated walking routes as the vehicle approaches the desired destination. Additionally, the navigation program may provide the end user with walking directions to walk to the desired destination along one of the calculated walking routes.

20 Claims, 11 Drawing Sheets

METHOD AND SYSTEM FOR PROVIDING WALKING INSTRUCTIONS WITH ROUTE GUIDANCE IN A NAVIGATION PROGRAM

REFERENCE TO RELATED APPLICATION

The present application is a continuation of 09/254,154 U.S. Pat. No. 6,208,934, filed Jan. 19, 1999.

BACKGROUND OF THE INVENTION

The present invention relates to improved navigation programming that provides information about walking to a final destination in combination with information about driving toward the final destination.

Navigation application programs are available that calculate a route from an origin location to a destination location in a geographic region. These navigation application programs use geographic data included in one or more geographic databases. The geographic data includes information about the road network in the geographic region. The kinds of information may include the positions of the roads in the geographic region, speed limits along portions of roads, address ranges along the road portions, turn restrictions at intersections of roads, direction restrictions such as one-way streets, and so on. Using geographic data that include these kinds of information, a navigation application program identifies a continuous series of road segments that connect between the origin and destination locations and then provides driving instructions for traveling along these identified road segments to reach the destination from the origin.

Although navigation application programs and navigation systems that include these kinds of programs can provide useful information, there continues to be room for additional advancements. For example, although navigation programs may calculate a route for an end user to drive to a desired destination and provide the end user with driving instructions to get to the destination, the end user may not necessarily be able to park at the destination location. The destination location may not provide parking or all the parking spaces at the destination location may already be occupied. Accordingly, there exists a need in navigation systems and/or navigation application programs to assist end users in locating and evaluating parking places at, or near to, the destinations to which the navigation systems or application programs direct the end users. There exists an additional need to take combinations of travel by driving and travel by walking into account when calculating a route to a destination with a navigation system or program. In addition, once a navigation system or program guides the end user to a parking place, the end user may require assistance to reach the desired destination. Accordingly, there exists a further need to assist end users of navigation systems and navigation programs to reach desired destinations after parking their vehicles.

SUMMARY OF THE INVENTION

To address these and other objectives, the present invention comprises a system and method that provide an end user of a navigation program with information about walking to a desired destination in combination with information about driving to or close to the desired destination. In addition to the calculation of a route for driving to the desired destination, the navigation program uses data in a geographic database to calculate one or more walking routes to reach the desired destination by walking from locations within a walking threshold around the desired destination. In calculating these one or more walking routes, the navigation program uses the data in the geographic database to assess the suitability of roads around the desired destination for pedestrian travel. In calculating these one or more-walking routes, the navigation program can also include road segments in the one or more walking routes without regard for travel restrictions that only apply to vehicular traffic. Additionally, if the navigation program is installed in a vehicle, the navigation program may indicate the walking distance to the desired destination along one of the calculated walking routes as the vehicle approaches the desired destination. In a further aspect of the inventive subject matter, the navigation program may provide the end user with walking directions to walk to the desired destination along the calculated walking route upon which the vehicle is parked.

DETAILED DESCRIPTION OF THE PRESENTLY PREFERRED EMBODIMENTS

I. EXEMPLARY NAVIGATION SYSTEM PLATFORM

A. Overview

Figure 1:
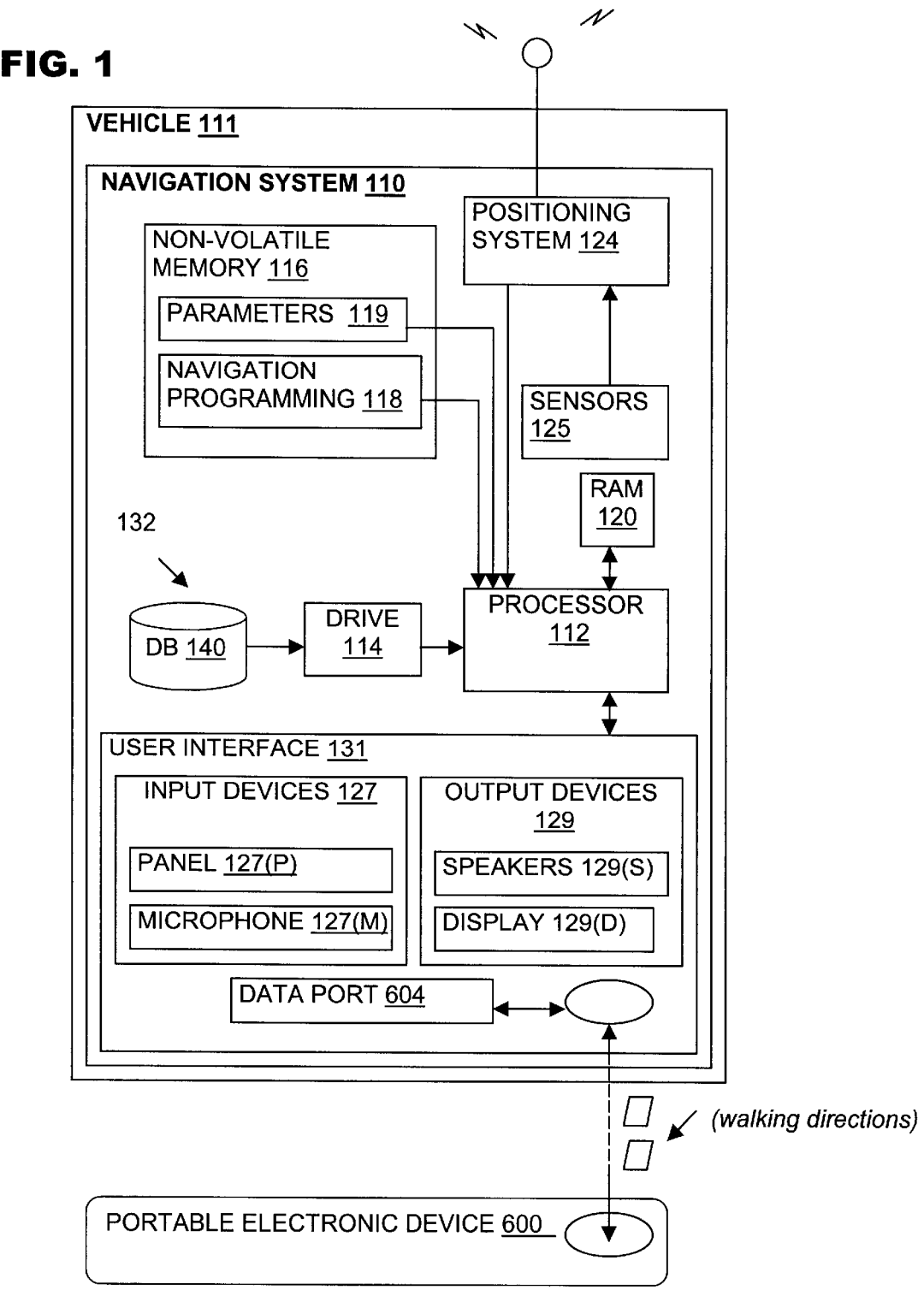
FIG. 1 is a block diagram illustrating a navigation system.

Referring to FIG. 1, there is a diagram illustrating an exemplary embodiment of a navigation system 110. The navigation system 110 may be stationary or portable. In the embodiment shown in FIG. 1, the navigation system 110 is a portable system located in a vehicle 111, such as an automobile, truck, or bus. In other embodiments, the navigation system 110 may be installed in other platforms, as explained below.

The navigation system 110 is a combination of hardware and software components. The hardware components of the navigation system 110 may include a processor 112, memory 120, and so on. In the embodiment of FIG. 1, the navigation system 110 also includes a positioning system 124 that determines the position of the vehicle 111 in which it is installed. The positioning system 124 may include sensors 125 or other components that sense the speed, orientation, direction, and so on, of the vehicle 111. The positioning system 124 may also include a GPS system.

The navigation system 110 also includes a user interface 131. The user interface 131 includes appropriate means 127 for receiving instructions and/or input from an end user of the navigation system. The user interface 131 may include a keyboard or input panel 127(P), a microphone 127(M), as well as other means for accepting end-user input, such as voice recognition software, and so on, through which the end user may request navigation information and services. The user interface 131 also includes appropriate means 129 for providing information back to the end user. The user interface 131 may include a display 129(D) and speakers 129(S) (including speech synthesis hardware and software) through which the end user can be provided with information and services from the navigation system 110.

All of the components described above may be conventional (or other than conventional) and the manufacture and use of these components are known to those of skill in the art. For example, the processor 112 may be of any type used in navigation systems, such as 32-bit processors using a flat address space, such as a Hitachi SH1, an Intel 80386, an Intel 960, a Motorola 68020 (or other processors having similar or greater addressing space). Processor types other than these, as well as processors that may be developed in the future, are also suitable.

B. The Geographic Database

In order to provide navigation features to an end user, the navigation system 110 uses geographic data 140. The geographic data 140 includes information about one or more geographic regions or coverage areas. The geographic data 140 may be stored in the vehicle 111 or alternatively, the geographic data 140 may be stored remotely and made available to the navigation system 110 in the vehicle 111 through a wireless communication system which may be part of the navigation system 110. In another alternative, a portion of the geographic data 140 may be stored in the vehicle 111 and a portion of the geographic data 140 may be stored in a remote location and made available to the navigation system 110 in the vehicle 111 over a wireless communication system from the remote location.

In the embodiment shown in FIG. 1, some or all of the geographic data 140 are stored on a medium 132 which is located in the vehicle 111. Accordingly, the navigation system 110 includes a drive 114 (or other suitable peripheral device) into which the medium 132 can be installed and accessed. In one embodiment, the storage medium 132 is a CD-ROM disk. In another alternative embodiment, the storage medium 132 may be a PCMCIA card in which case the drive 114 would be substituted with a PCMCIA slot. Various other storage media may be used, including fixed or hard disks, DVD disks or other currently available storage media, as well as storage media that may be developed in the future.

The geographic data 140 may take a variety of different forms. In one embodiment, the geographic data 140 is in the form of one or more computer-readable data files or databases. The geographic database includes data specifying the positions of the roads in the covered geographic region(s). The geographic database also includes data relating to the roads, such as restrictions on directions of travel along the roads (e.g., one-way streets), street addresses along the roads, street names, speed limits along the roads, turn restrictions at intersections, and so on. The geographic data 140 may also include information about points of interest in the geographic area, such as hotels, restaurants, museums, stadiums, offices, automobile dealerships, auto repair shops, etc. The geographic data 140 may also include information about places, such as cities, towns, or other communities. The geographic database 140 may include other kinds of data about the geographic area.

In one embodiment, the geographic database contains a plurality of road segment data entities. Each road segment data entity represents a portion (or segment) of a navigable road in the geographic region. In one type of geographic database, there is at least one database entry (also referred to as "entity" or "record") for each road segment represented in a geographic region. Each physical road segment has two nodes associated with it, one at each of the endpoints of the road segment. In this embodiment, the geographic data 140 also includes a plurality of data entities that represent these nodes.

Figure 2:
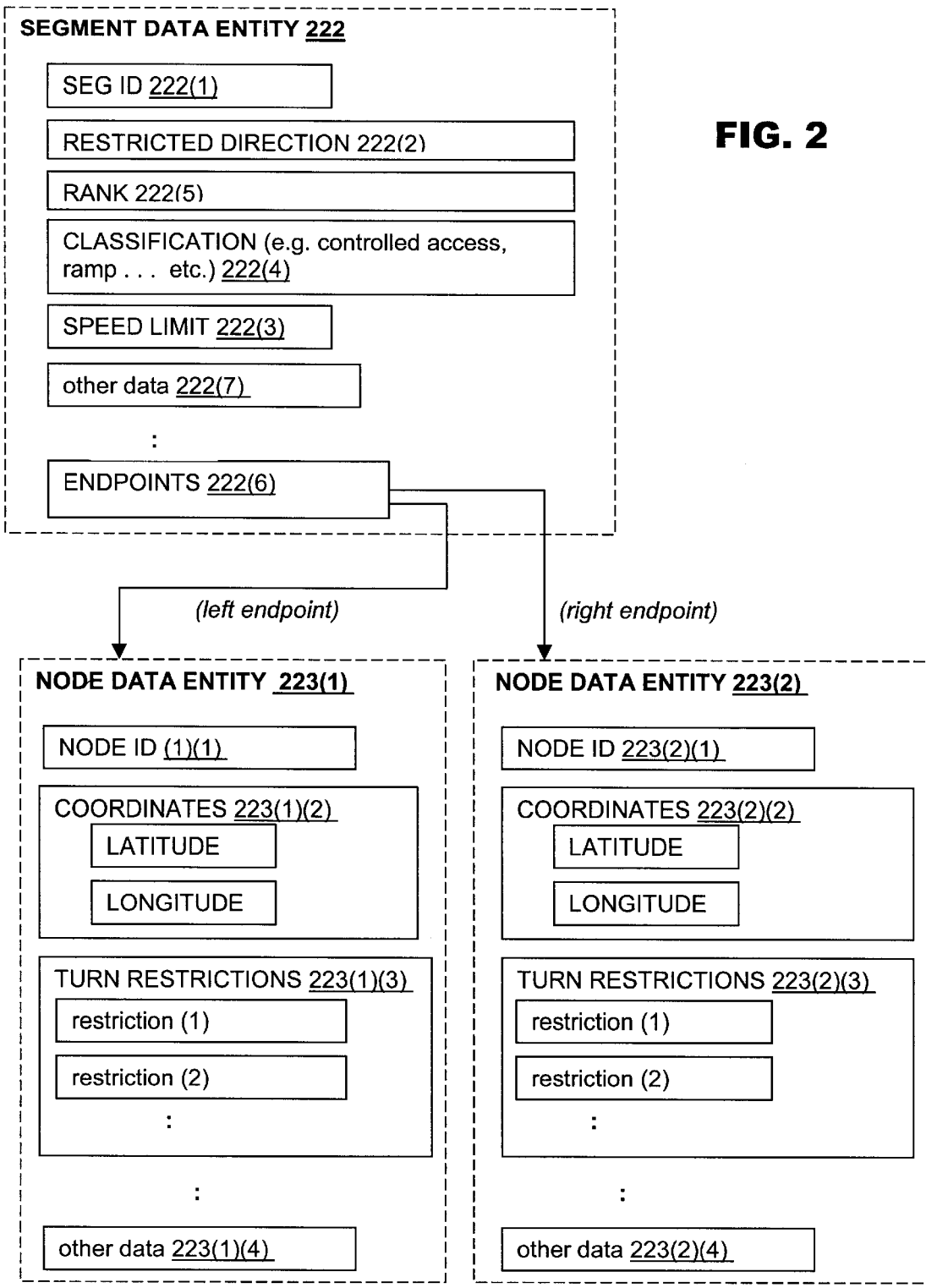
FIG. 2 is a block diagram illustrating components of a road segment data entity included in the geographic database of FIG. 1.

Data are associated with each road segment data record to describe features or characteristics of the represented road segment. FIG. 2 illustrates some of the components of a road segment data entity 222 included in the geographic data 140. The road segment entity 222 includes a segment ID 222(1) by which the record can be identified in the geographic database. The road segment data entity 222 may also include data 222(2) that indicates the direction of vehicular travel permitted on the represented road segment and data 222(3) that indicates the maximum permitted vehicular speed of travel on the represented road segment record. The road segment data entity 222 may also include data 222(4) indicating whether the represented road segment is part of a controlled access road (such as an expressway), a ramp to a controlled access road, a bridge, a tunnel, a toll road, a ferry, and so on. The road segment data entity 222 may also include data 222(5) that indicates a rank of the represented road segment. (A rank of a road segment may correspond to its functional class. For example, road segments having a rank of "4" may include high volume, controlled access roads, such as expressways and freeways. Road segments having a rank of "3" may be high volume roads with few speed changes, but are not necessarily controlled access roads. The lower ranked roads handle corresponding lower volumes and generally have more speed changes or slower speeds. Road segments having a rank of "0" can handle the lowest volumes. For example, these may include side streets, alleyways, etc.)

The road segment data entity 222 also includes data 222(6) providing the geographic coordinates (e.g., the latitude and longitude) of the endpoints of the road segment. In one embodiment, this data 222(6) is a reference to node data entities 223(1) and 223(2) defined for the nodes corresponding to the endpoints of the represented road segment. Also associated with the road segment data entity 222 are data 223(1)(2) and 223(2)(2) indicating what, if any, turn restrictions exist at each of the endpoints of the road segment.

The various attributes associated with a road segment may be included in a single road segment record, or may be included in more than one type of record which are cross-referenced to each other. (The term "segment" represents only one terminology for describing this physical geographic feature and other terminology for these features is intended to be encompassed within the scope of these concepts.)

The road segment record 222 may also include or be associated with other data 222(7) that include or refer to various other attributes of the represented road segment, such as the street address range along the represented road segment, the name of the road of which the represented road segment is a part, the highway designation of the road of which the road segment is a part, and so on.

In one embodiment, the geographic data are provided by Navigation Technologies Corporation of Rosemont, Ill. However it is understood that the inventive concepts disclosed herein are not restricted to any particular source of data.

C. The Navigation Programming

In addition to the hardware components and geographic database, the navigation system 110 includes or uses navigation programming 118. The navigation programming 118 includes the software that provides for the functions and/or features performed by the navigation system 110. The navigation programming 118 uses the geographic data 140 in conjunction with input from the end user via the user interface 131, and possibly in conjunction with outputs from the positioning system 124, if available, to provide various features and/or functions.

The navigation programming 118 may be stored in a non-volatile storage medium 116 in the navigation system 110. Alternatively, the navigation programming 118 and the geographic data 140 may be stored together on a single storage device or medium. Alternatively, the navigation programming 118 may be located at a remote location and may be provided to or accessed by the navigation system 110 over a communications system.

In one embodiment, the navigation programming 118 is written in the C programming language although in alternative embodiments other programming languages may be used, such as C++, Java, Visual Basic, and so on.

Figure 3:
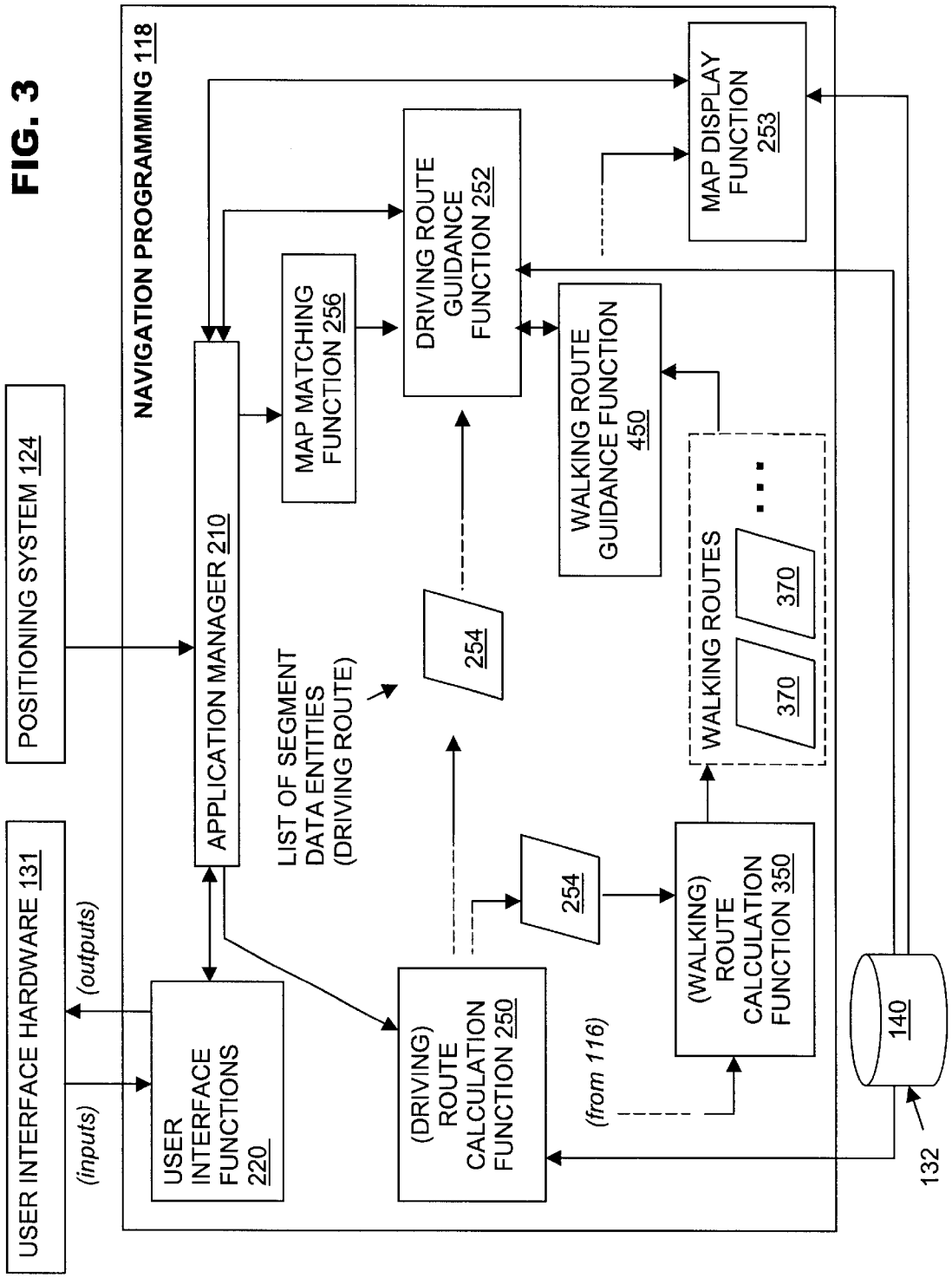
FIG. 3 is a block diagram illustrating components of the navigation programming shown in FIG. 1.

The navigation programming 118 may be formed of separate component applications (also referred to as programs, subprograms, routines, or tools). The component applications of the navigation programming 118 work together through defined programming interfaces. FIG. 3 shows a block diagram illustrating some of the component applications for one embodiment of the navigation programming 118 included in the navigation system 110 of FIG. 1. In addition to the component programs shown in FIG. 3, the navigation programming 118 may include other component sub-routines or programs.

In FIG. 3, the navigation programming 118 is shown to include a navigation application manager 210. The navigation application manager 210 is a program or routine that provides for overall management of the functions of the navigation system 110. The navigation application manager 210 may also include support for and interfaces to the navigation system hardware, such as the positioning system 124 and the user interface 131. The navigation application manager 210 includes user interface functions 220 to interface with the user interface hardware 131. These user interface functions 220 may provide for presenting a menu to the end user on the screen display 129(D) of the user interface hardware 131, accepting inputs from the end user via the input devices 127 of the user interface hardware 131, displaying results to the end user on the screen display 129(D) of the user interface hardware 131, and so on.

The navigation programming 118 includes sub-programs or routines that interface with the navigation application manager 210 and that provide for specific navigation features or functions to be performed by the navigation system. These sub-programs include a route calculation function 250, a route guidance function 252, and a map display function 253. The navigation programming 118 may include navigation functions in addition to these.

The route calculation function 250 receives a request to calculate a route to a desired destination. The request may be in the form of an identification of a starting location and a desired destination location. The identification of these locations may include the geographic coordinates of these locations. The route calculation function may also be provided with other data or parameters, such as driving preferences (e.g., avoid toll roads). Given at least the identification of a starting location and a desired destination location, the route calculation function 250 attempts to determine one or more solution routes between the starting location and the destination location. A solution route is formed of a series of connected road segments over which a vehicle can travel from the starting location to the destination location. When the route calculation function 250 calculates a route, it accesses the geographic data 140 and obtains road segment data entities 222 that represent road segments around and between the starting location and the destination location. The road calculation function 250 uses the information in the road segment data entities 222 to attempt to determine at least one valid solution route from the starting location to the destination location. In determining a valid solution route for a vehicle to travel, the route calculation program 250 uses the data attributes associated with the road segment data entities to account for direction of travel restrictions (e.g., one-way streets), turn restrictions at intersections (e.g., no left turns), and so on. The route calculation function 250 may attempt to find a solution route that takes the least time to travel, that covers the least distance, or that meets some other specifiable criteria.

The route calculation function 250 may use various means or algorithms in determining solution routes. Methods for route calculation are disclosed in Ser. No. 09/047,698, filed Mar. 25, 1998, the entire disclosure of which is incorporated by reference herein. (The methods disclosed in the aforementioned patent application represent only some of the ways that routes can be calculated and the subject matter claimed herein is not limited to any particular method of route calculation. Any suitable route calculation method now known or developed in the future may be employed.)

Figure 4:
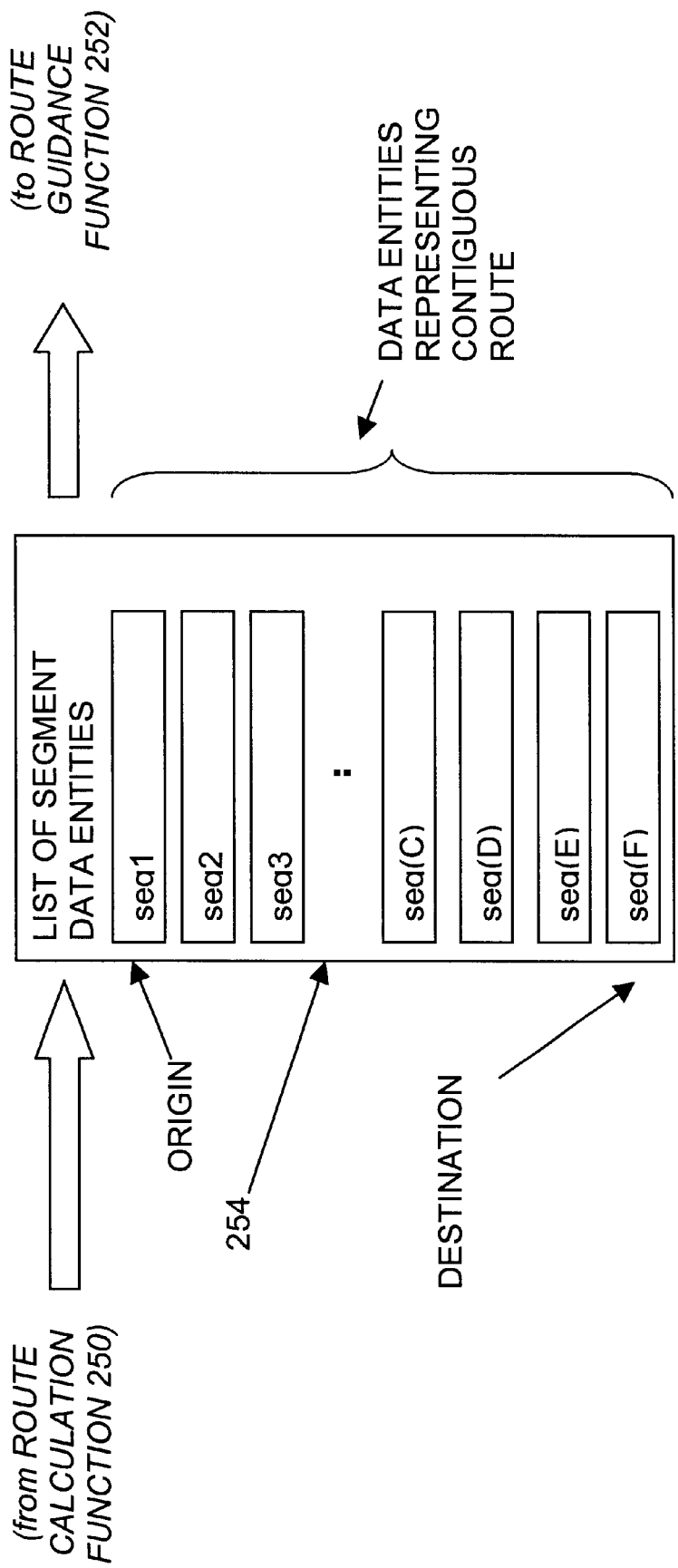
FIG. 4 is a block diagram illustrating components of the output of the route calculation function shown in FIG. 3.

The route calculation function 250 provides an output. In the embodiment of FIG. 3, the output of the route calculation function 250 is in form of an ordered list 254 identifying a plurality of road segment data entities. FIG. 4 illustrates the road segment data entities 222 (i.e., seg1, seg2, seg3, . . . , seg(E), seg(F)) from the geographic database 140 included in an exemplary output list 254 generated by the route calculation function 250. The plurality of road segment data entities 222 represent the road segments that form the continuous navigable route between the origin and the destination that had been calculated by the route calculation function 250. (The route calculation function 250 may calculate more than one solution route.)

Referring again to FIG. 3, the list 254 of road segment data entities determined by the route calculation function 250 is provided to the route guidance function 252. The route guidance function 252 uses the information in the list 254, as well as additional information from the geographic database 140, to provide instructions to the end user to travel the route defined by the list 254 output by the route calculation function 250. The route guidance function 252 may include functions that identify locations along the calculated route at which maneuvering instructions may be provided to the end user. The route guidance function 252 may also include functions that formulate the maneuvering instructions for visual output and/or audio output. The route guidance function 252 may provide the maneuvering instructions all at once, or alternatively, the route guidance function 252 may provide the maneuvering instructions one at a time as the vehicle is traveling. In one embodiment, each maneuvering instruction is provided separately (or in small groups of combined maneuvering instructions) in advance of when the specific maneuver is required to be taken so that the end user can prepare to make the required maneuver.

In order to provide maneuvering instructions at appropriate times and/or locations, the navigation system 110 uses data from the positioning system (124 in FIG. 1). The positioning system 124 determines the position of the vehicle as it is traveling. A map-matching function 256 in the navigation programming 118 compares the vehicle position determined by the positioning system 124 to the positions of the road segments represented by the road segment data entities in the solution driving route 254. Using this comparison, the maneuver instructions, which are related to positions along the solution driving route, can be provided at appropriates times as these positions are approached.

The route guidance function 252 may also provide the end user with information about the remaining distance to the destination location. The navigation application manager 210 and the route guidance function 252 may also use the outputs from the positioning system 124 and the map-matching function 256 for this purpose.

The list 254 of road segment data entities from the route calculation function 250 may also be provided to the map display function 253. The map display function 253 uses the information in the list 254, as well as additional information from the geographic database 140, to provide graphical maps on the display (129(D) in FIG. 1) of the user interface 131. The graphical maps illustrate the areas through which the calculated route passes. The path of the calculated route may be highlighted on the displayed maps. The map display function 253 interfaces with the navigation application manager 210 so that the display maps are provided as the vehicle is traveling the calculated route. The navigation application manager 210 and the map display function 253 may receive the outputs from the positioning system 124 and the map-matching function 256 for this purpose.

II. DRIVING/WALKING COMBINATIONS

As mentioned above, a navigation system that provides route calculation functions is very useful, providing an end user with information to reach a desired destination by vehicle. End users may enjoy even greater advantages with one or more of the embodiments disclosed herein. The disclosed embodiments augment navigation systems or navigation programming that provides end users with information for driving to destinations with features that provide information about reaching destinations by walking in combination with driving.

A. FIRST EMBODIMENT

According to the first disclosed embodiment, the end user of a navigation system or program obtains information for driving a route to a destination and obtains information about walking a final portion of the route to the destination. The information provided to the end user can include the walking distance to the destination as well as instructions for walking to the destination.

In this embodiment, the calculation of one or more walking routes is undertaken after the route calculation function 250 calculates at least one driving route to the desired destination. The calculation of one or more walking routes may be begun immediately after the driving route is calculated or at any time after the driving route is calculated even after the end user has embarked upon traveling the calculated driving route toward the desired destination. In this embodiment, the calculation of the one or more walking routes is automatic, i.e., calculation of the one or more walking routes begins in the background as the end user is traveling toward the destination. Alternatively, the end user may be prompted with a message on the display screen 129(D) of FIG. 1 asking whether the end user wishes to have walking routes calculated.

According to this embodiment, any suitable method is used first to calculate a driving route to the desired destination. When calculating the driving route, the navigation programming 118 uses the geographic database 142 to identify road segments leading from a starting location to a desired destination location. As described above in connection with FIG. 3, when calculating a driving route, the route calculation function 250 develops a list 254 of road segment data entities 222 that represent portions of roads that form a continuous route from the starting location to the destination location. In this embodiment, the navigation programming 118 includes additional functions that provide a new kind of information about walking routes described herein.

Figure 5:
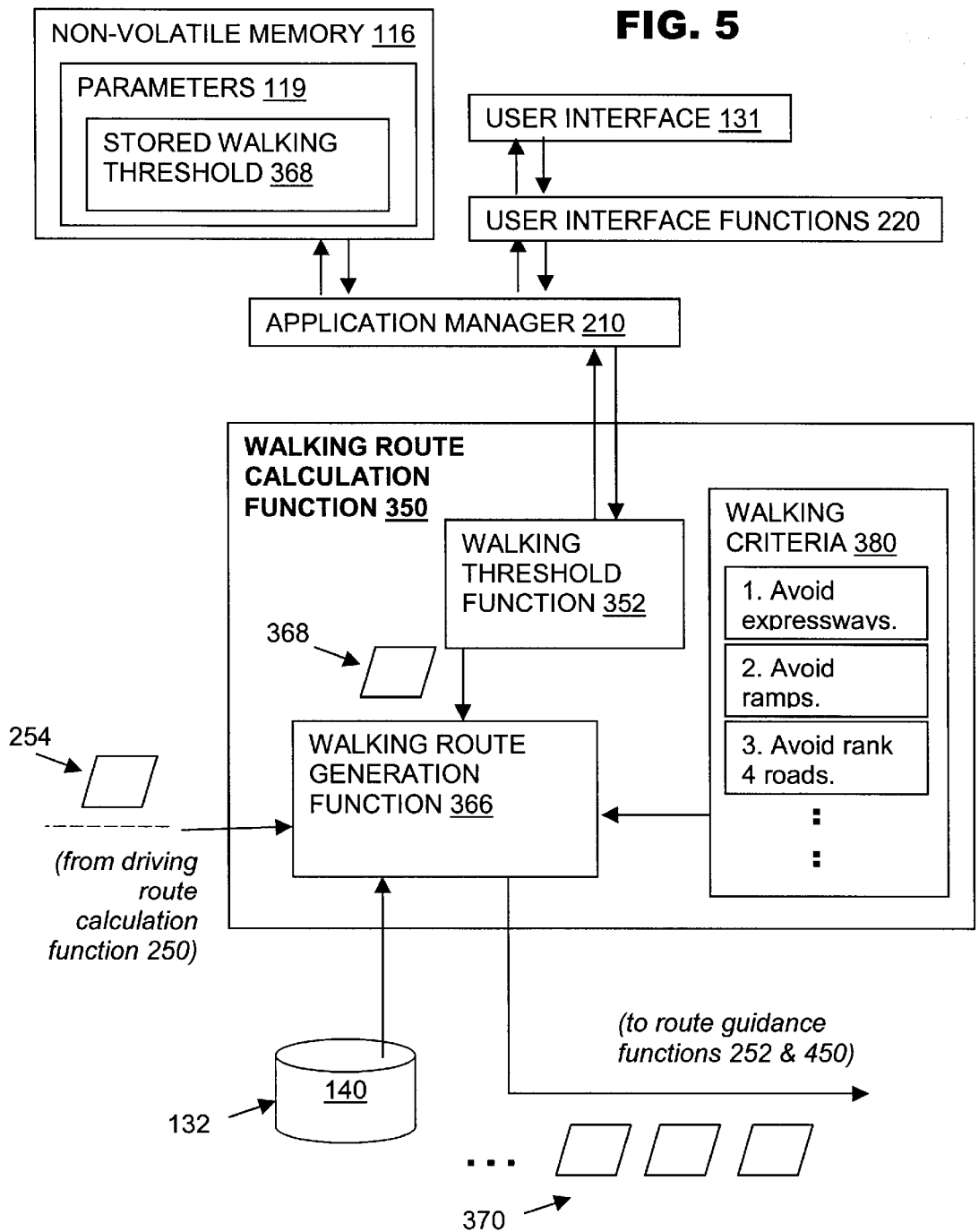
FIG. 5 is a diagram illustrating components of the walking route calculation function shown in FIG. 3.

Referring to FIG. 3, according to this embodiment, the navigation programming 118 includes a walking route calculation function 350. The walking route calculation function 350 interfaces with the other functions in the navigation programming 118. (Alternatively, the walking route calculation function 350 may be implemented as part of the driving route calculation function 250.) Components of the walking route calculation function are shown in FIG. 5.

Provision of walking threshold. Referring to FIG. 5, the walking route calculation function 350 uses a "walking threshold" parameter 368. The walking threshold parameter 368 defines a maximum distance that the end user is willing to walk to get to the destination. The walking threshold parameter is set prior to calculation of the one or more walking routes. A new walking threshold parameter may be specified by the end user for each driving route to be calculated. The new walking threshold parameter may be set after the end user has embarked towards the destination, or the new walking threshold parameter may be set at the time the end user requests that a driving route be calculated to the desired destination. Alternatively, a default walking threshold parameter may be used. The default walking threshold parameter may be provided by the navigation programming or the default walking threshold parameter may be specified by the end user. For example, a default walking threshold parameter may be 2 km. However, the default walking threshold parameter may be set by the end user to a greater or lesser distance, such as 0–4 km.

The walking route calculation function 350 includes an appropriate sub-routine or program to provide for specification and use of a walking threshold parameter. Referring to FIG. 5, the walking route calculation function 350 includes a walking threshold function 352 for this purpose. The walking threshold function 352 outputs a request to the user interface functions 220 (i.e., through the navigation manager 210) to prompt the end user to provide a walking threshold. A menu may be provided to the end user for this purpose.

Figure 6:
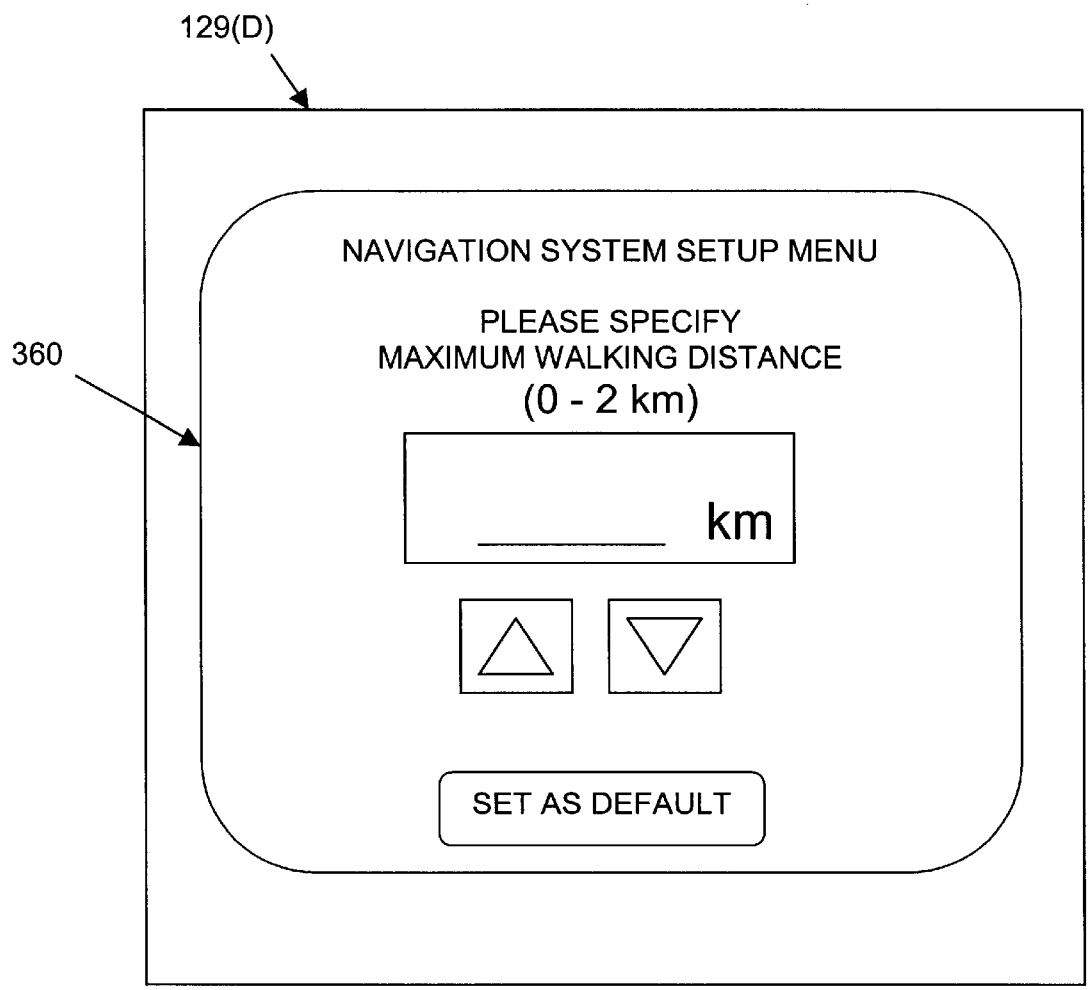
FIG. 6 is an illustration of a setup menu for setting the walking threshold displayed on a display screen of the user interface shown in FIG. 1.

FIG. 6 illustrates a menu 360 on the display 129(D) of the user-interface 131 of the navigation system 110. The menu 360 allows the end user to select a walking threshold. The menu 360 may define a range in which the walking threshold may be specified (e.g., 0–4 km). The menu 360 may allow the walking threshold specified by the end user be set as the default walking threshold. If the end user chooses not to specify a walking threshold using the menu 360, the walking threshold function 352 uses a default walking threshold parameter. The default walking threshold parameter, whether specified by the end user or specified by the navigation programming, is stored in non-volatile memory (e.g., among the parameters 119 stored in the non-volatile memory 116 in FIG. 1) so that it is available whenever the navigation programming 118 is used.

(In alternative embodiments, the walking threshold may be used to take into account factors other than just distance. For example, the walking threshold may be used to avoid steep uphill segments or segments leading up stairways. These road segments may have a higher cost associated with them than flat walkways. Also, users might want to avoid walking along busy road segments or road segments in unlighted areas, or users might prefer walking along road segments with lighter traffic. In alternative embodiments, the walking threshold can be used to take these factors into account. Further, the walking threshold might take into account cost differences between cement sidewalks, gravel paths, etc.)

Generation of walking route(s). Referring again to FIG. 5, the walking route calculation function 350 also includes a walking route generation function 366. The walking route generation function 366 attempts to determine one or more walking routes. This function 366 uses as its input the walking threshold parameter 368 from the walking threshold function 352 and the one or more driving routes 254 calculated by the (driving) route calculation function 250. Each of the walking routes calculated by the walking route generation function 350 is formed of one or more road segment data entities along which a person can walk in order to reach the destination. According to this embodiment, the walking route generation function 366 uses the same geographic database 142 to calculate the one or more walking routes that was used by the driving route calculation function 250 to calculate the one or more driving routes from the starting location to the destination location.

In developing one or more walking routes, one objective of the walking route generation function 366 is to provide the end user with information that allows the end user to evaluate the option of parking his/her vehicle around the location of the destination and walking the remaining distance to the final destination from the location at which the vehicle has been parked. In evaluating this option, the walking route generation function 366 accounts for the fact that a walking route to the final destination is not necessarily the same at the driving route to the final destination. One reason for this is that different constraints apply to walking along road segments compared to driving along road segments.

The walking route generation function 366 operates by calculating one or more walking routes "backwards" from the destination out to the limit of the walking threshold. That is, starting at the location of the destination, the road segment data entities representing each of the road segments leading to the location of the destination are examined. These road segment data entities 222 may have to be obtained from the geographic database 140, or alternatively, these road segment data entities 222 may already be in the memory (120 in FIG. 1) of the navigation system from the previous calculation of the driving route. When each of these road segment data entities is evaluated by the walking route generation function 366, walking criteria 380 are used. These walking criteria 380 are applied to the data in the road segment data entities 222. Using these criteria, the walking route generation function 366 avoids using any road segment data entity 222 in a potential solution walking route if the road segment represented by the road segment data entity does not allow or is otherwise not suitable for pedestrian traffic. For example, one of the walking criteria 380 checks whether the rank attribute (222(5) in FIG. 2) of the road segment data entity 222 is "4." A road segment having a rank of "4" is likely to be an expressway or other high volume road. Since such a road is not suitable for pedestrian traffic, roads with a rank of "4" will not be considered in potential solution walking routes. Other tests in the walking criteria 380 include checking whether the road segment data entity includes attributes that indicate that the represented road is part of a controlled access road, a ramp to a controlled access road, a toll road, and so on. Other tests may evaluate whether a highway divider or other type of road barrier prevents pedestrian access.

On the other hand, when evaluating the road segment data entities that represent roads leading to the destination location, the walking route generation routine 366 does not eliminate roads due to direction of travel restrictions (222(2) in FIG. 2) that apply to the road segments. It is assumed that one-way street restrictions do not apply to pedestrians.

As mentioned above, the function 366 attempts to calculate at least one, and optionally more than one, walking route to the final destination. These walking routes terminate at one end at the location of the final destination and extend outward in at least one direction from the location of the final destination along pedestrian-usable road segments to the limit defined by the walking threshold.

The walking routes are intended to help the end user evaluate the option of parking around the location of the final destination. Therefore, since the end user is expected to approach the final destination along the calculated driving route, the walking route generation function 366 attempts to calculate at least one walking route that intersects or extends along the road segments that comprise the driving route into the destination as calculated by the route calculation function 250. However, because the walking route is subject to different constraints, as mentioned above, the walking route to the final destination may not follow the driving route exactly.

Figure 7:
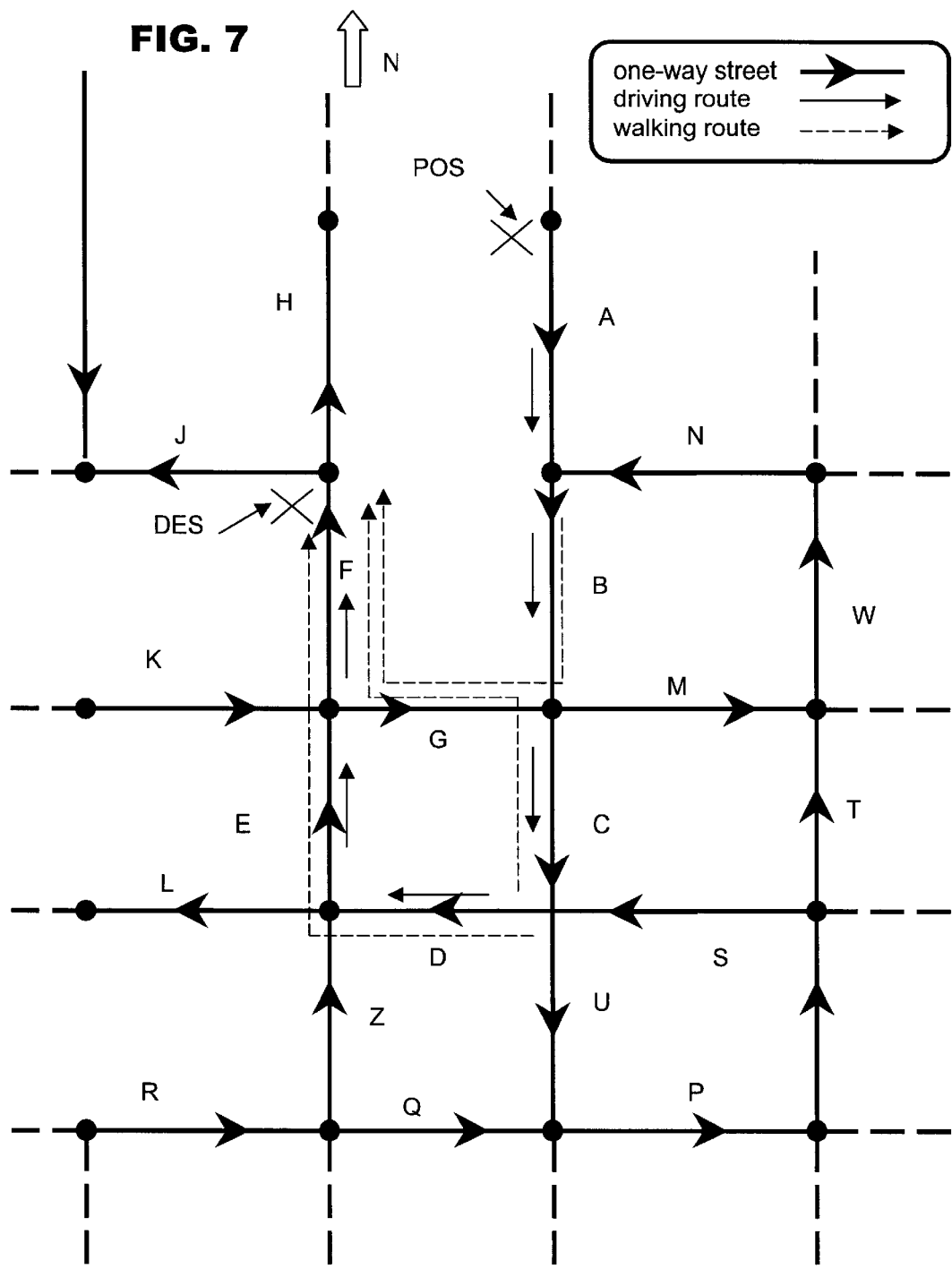
FIG. 7 depicts a network of streets around a destination and is used to illustrate operation of the embodiment of FIG. 3.

For example, FIG. 7 illustrates streets around a destination location, DES. In this example, it is assumed that the starting position for the driving route is located at some position further away from the streets illustrated in FIG. 7. The road segments around the destination DES include one-way streets (indicated by the embedded arrows). Because of these one-way streets, the driving route calculation function 250 determined that the final road segments to be traveled to reach the destination DES by vehicle include the road segments labeled A, B, C, D, E and F. Accordingly, referring to FIG. 8, the list 254 of the road segment data entities in the solution driving route calculated by the driving route calculation function 250 includes SEG (A), SEG(B), SEG(C), SEG(C), SEG(D), SEG(E), and SEG(F). For calculation of the walking routes, it is assumed that the walking threshold had been set to 1 km and that the lengths of the road segments A, B, C, D, E, F, and G, are all 0.25 km. The walking route generation function 366 begins calculating walking routes by examining the road segment data entities leading into the destination DES. Accordingly, the walking route generation function 366 would examine the data attributes associated with the road segment data entities that represent the road segments labeled F, J, and H. In one embodiment, the walking route generation function 366 first examines the road segment data entities leading into the destination DES along the driving route. Assuming that the road segment data entity SEG(F) met the criteria 380 as a pedestrian-usable road segment, the road segment data entity SEG(F) would be added to a potential walking route.

After the road segment data entity SEG(F) is added, the road segment data entities that represent the road segments connecting to and leading into the road segment represented by SEG(F) are evaluated. These road segments are G, K, and E, and the corresponding road segment data entities that represent these road segments are SEG(G), SEG(K), and SEG(E), respectively. Note that even though the road segment labeled G was not used in the driving solution route because of a direction restriction (i.e., it is one-way eastbound), it would be available in a potential walking solution route because pedestrians are assumed not to be constrained by one-way street restrictions. Moreover, when evaluating the data attributes of SEG(G), it is noted that it intersects with the solution driving route. Accordingly, the walking route generation function 366 adds SEG(G) to a potential solution walking route. From SEG(G), the walking route generation function 366 follows the driving route backwards away from the destination and adds SEG(B) and SEG(A) to the potential solution walking route.

Figure 8:
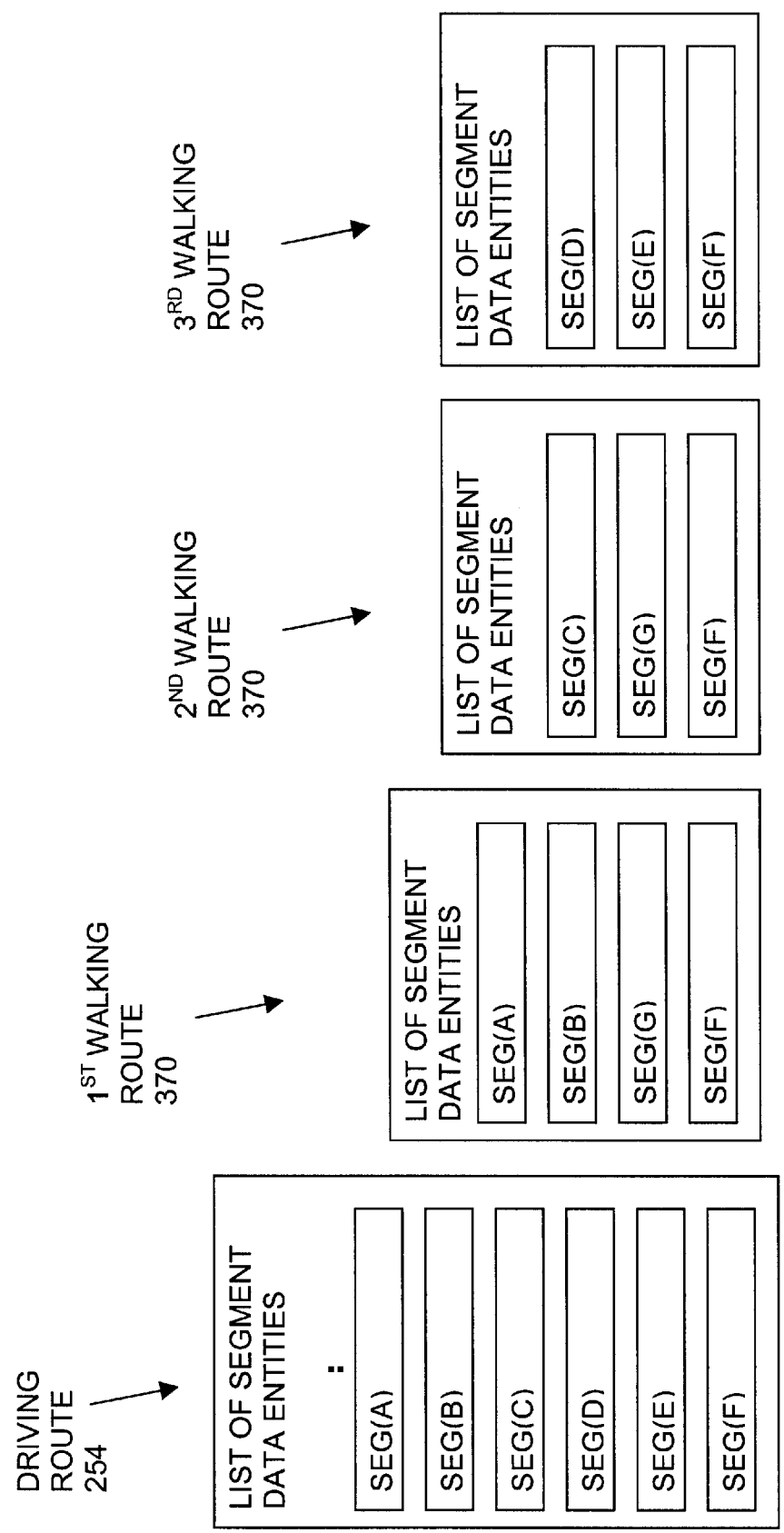
FIG. 8 shows block diagrams illustrating components of a calculated routes for driving and walking used in connection with the example of FIG. 7.

At this point, the distances of the four segments in the potential walking solution route add up to the walking threshold (i.e., 0.25 km+0.25 km+0.25 km+0.25 km=1.0 km). Referring to FIGS. 3, 5, and 8, the walking route generation function 366 identifies the four segment data entities SEG(A), SEG(B), SEG(G) and SEG(F) as an initial solution walking route 370. Then, the walking route generation function 366 forwards the initial solution walking route 370 to a walking route guidance function 450 associated with the driving route guidance function 252. Alternatively, the walking route generation function 366 may temporarily save the initial solution walking route in memory while additional solution walking routes are calculated.

The walking route generation function 366 may calculate additional walking routes to cover road segments in the solution driving route that were not included in the initial solution walking route. In the example of FIG. 7, the walking route generation function 366 may form the following two additional walking routes:

SEG(F), SEG(G), and SEG(C) and SEG(F), SEG(E), and SEG(D).

These additional walking routes are shown in FIG. 8. These two additional solution walking routes cover the road segments C, D, and E, along the driving route to the destination. Note that the first of these walking routes, SEG(F), SEG(G), and SEG(C), does not travel in the same direction as the driving route along the road segment labeled C because it is shorter to walk north along the road segment and then walk west on the road segment labeled G to get to the destination. The walking route generation function 366 may then forward these two additional solution walking routes 370 to the walking route guidance function 450 or alternatively, the walking route generation function 366 may temporarily save these solution walking routes while additional solution walking routes are calculated.

The walking route calculation function 350 may calculate additional walking routes that extend outside the driving route to the destination. These additional walking routes are calculated so that they are readily available, if needed, if the end user departs from the driving route to the destination. As mentioned above, an objective of the walking route calculation function is to provide the end user with information to help evaluate the option of parking his/her vehicle at a location away from the final destination and then walking the remaining distance to the final destination. If the end user drives all the way to the final destination and does not find a parking place, the end user may continue to drive past the final destination or around the final destination seeking a parking place. To account for departures from the driving route to the final destination, the walking route calculation function 350 may calculate additional walking routes. These additional walking routes may be calculated prior to when the vehicle departs from the driving route to the final destination, or alternatively, the additional walking routes may be calculated at the time that the vehicle departs from the driving route. Whether additional walking routes are calculated prior to departing from the driving route may depend upon the memory resources of the navigation system, as well as the size of the walking threshold and the density of the road network around the location of the final destination. For example, in FIG. 7, additional walking routes 370 may be calculated along the following road segments: {F, E, G, Q}, {F, G, M, W}, (F, G, M, W), {F, G, M, T}, {F, E, G, Q}, and so on. These additional solution walking routes 370 are forwarded by the walking route generator function 366 to the walking route guidance function 450 along with any other solution walking routes already calculated.

Figure 9:
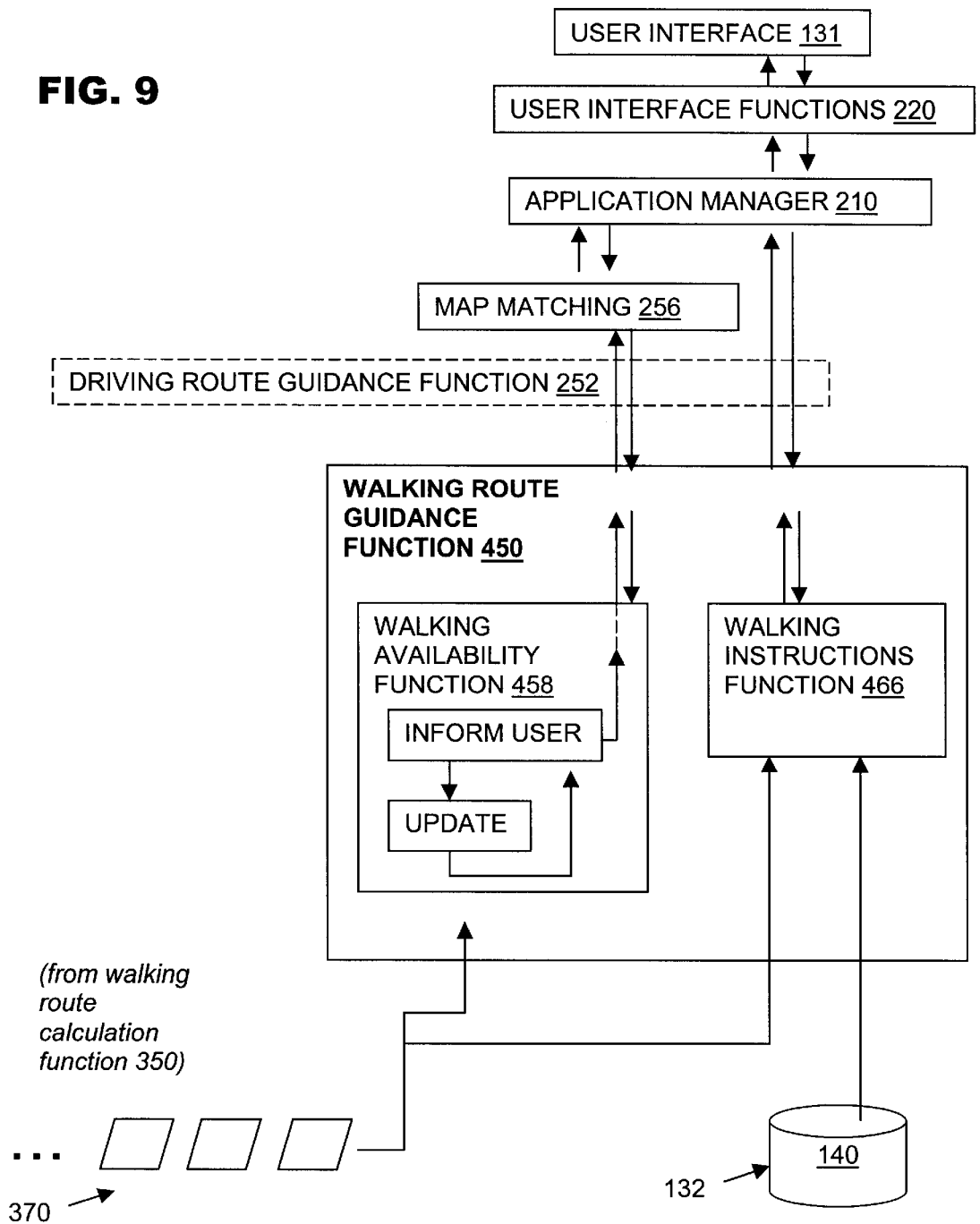
FIG. 9 is a diagram illustrating components of the walking route guidance function shown in FIG. 3.

Indication of availability of walking routes. Referring again to FIG. 3, the walking route guidance function 450 is included among the programming components that comprise the navigation programming 118. The walking route guidance function 450 interfaces with the walking route calculation function 350 and the driving route guidance function 252. The walking route guidance function 450 provides two kinds of services. First, the walking route guidance function 450 provides an indication to the end user, in the form of a message for example, about the availability of a walking route to the final destination. Second, the walking route guidance function 450 provides information about the available walking route. This information can include the walking distance to the final destination and/or directions to walk to the final destination from a location, such as the location at which the vehicle has been parked, for example. Components of the walking route guidance function are shown in FIG. 9.

The walking route guidance function 450 may operate in conjunction with the driving route guidance function 252. As mentioned above, as the end user drives the vehicle along the calculated route, the navigation system provides the end user with maneuvering instructions as the vehicle approaches locations at which driving maneuvers are required. The walking route guidance function 450 operates in a similar manner.

The walking route guidance function 450 includes a walking availability function 458. The walking availability function 458 evaluates the position of the vehicle relative to the segment data entities in the solution walking routes 370 using the same or similar method used by the driving route guidance function 252. (Alternatively, the walking route guidance 450 may be implemented as part of the driving route guidance function 252.) When the vehicle is traveling on any of the road segments represented by road segment data entities in any of the solution walking routes, the walking availability function 458 provides for an indication to be presented to the end user to inform about the availability of a walking route from a present position of the vehicle to the final destination. The indication may take the form of a message on the display (129(D) in FIG. 1). The message may also indicate the walking distance to the final destination. To provide this message, the walking availability function 458 may output a request to the user interface functions 220 (i.e., through the navigation manager 210). The walking distance information, which is provided to the end user, is derived from the walking route 370 generated by the walking route calculation function 350 that contains the road segment data entity representing the road segment upon which the vehicle is located. The distance to the final destination along this walking route 370 takes into account only pedestrian-usable road segments. Also, the walking distance provided to the end user is the shortest walking distance to the final destination. As noted before, the walking distance to the final destination is not necessarily the same as the driving distance. In one embodiment, the indication about the availability of a walking route to the final destination and the walking distance to the final destination are provided automatically. This information can be used by the end user to evaluate parking spaces as the destination is approached.

The walking availability function 458 continues to provide and update the walking distance to the final destination as the vehicle continues to travel toward the destination. Because the walking solution routes 370 do not necessarily coincide with the driving solution route 254, the walking distance to the final destination may increase along road segments even as the driving distance to the final destination decreases. This updated information about walking routes can also be used to evaluate parking spaces as the destination is approached.

If the end user has not found a parking space along the driving solution route to the final destination, he/she may drive around the final destination looking for a parking space. The walking availability function 458 can continue to provide walking distance information even if the vehicle has departed from the driving route provided that the vehicle is still on a road segment represented by a road segment data entity in any of the solution walking routes 370. If the walking route calculation function 350 has not calculated all the possible solution walking routes within the walking threshold, the walking route guidance function 450 may send a request to the walking route calculation function 350 to calculate additional solution walking routes at this time. The additional solution walking routes may be calculated taking into account the location and bearing of the vehicle.

The map-matching function 256 in the navigation programming 118 may determine if the vehicle departs from the solution driving route at any time as the vehicle approaches the destination. The vehicle may depart from the solution driving route intentionally or unintentionally. If the vehicle departs from the solution driving route as the destination is approached, it may be necessary to calculate a new solution driving route. If a new solution driving route is calculated, one or more new solution walking routes may be calculated as well, using the same process as described above.

As described above, the walking route guidance function 350 attempts to determine one or more walking routes to the final destination within the distance specified by the walking threshold. The walking route calculation function 350 attempts initially to determine one or more routes that include the roads segments in the driving route to the final destination because the end user is expected to travel along these segments when approaching the final destination. It may occur that the road segments in the driving route leading into the final destination are not pedestrian-usable (i.e., they do not satisfy the walking criteria 380 in FIG. 5). In this situation, the walking route guidance function 450 may display a message to the end user indicating that there are no walking routes from parking places along the driving route. Even if there are no walking routes to the final destination from locations along the driving route, the walking route calculation function 350 may still determine one or more walking routes that do not follow the driving route, as described above. In this case, the walking route guidance function 450 may display a message to the end user indicating that walking routes to the final destination are available from locations off the driving route. The walking route guidance function 450 may display a message giving the end user the option of being guided to these locations.

It may also occur that there are no walking routes at all to the final destination (i.e., none of the road segments leading to the final destination is pedestrian-usable). In this situation, the walking route guidance function 450 may display a message to the end user indicating that there are no walking routes to the final destination.

Provision of walking directions. As an additional feature, the navigation system 110 can provide the end user with walking directions to the destination from any location. In one embodiment, these directions are provided by a walking instructions function 466 associated with the walking route guidance function 450. According to one embodiment, the navigation system provides these walking instructions to the end user automatically once the end user has stopped and parked the vehicle. Alternatively, if the end user wishes to evaluate a walking route prior to parking his/her vehicle, the navigation system may provide these walking directions to the end user prior to parking the vehicle upon a request by the end user input to the user interface.

Walking directions to the final destination can be provided regardless of the position of the vehicle relative to the final destination. It is not necessary that vehicle be parked along one of the walking routes calculated by the walking route calculation function 350, nor is it necessary that the vehicle be parked.

If the end user wants walking directions to the final destination from a specified position along one of the road segments represented by a road segment data entity in one of the solution walking routes 370 that had already been calculated by the walking route calculation function 250 and maintained in memory, the walking instructions function 466 uses the already calculated solution walking route that contains the road segment along which the specified position is located to provide the end user with walking directions to the final destination. These walking directions explain how to proceed from the specified position along the road segment along each of the road segments represented by consecutive road segment data entities in the solution walking route leading to the destination. This provides the end user with a route that is not only pedestrian-usable but that is also the shortest walking route to the destination from the specified position. As noted above, the shortest walking route is not necessarily the same as the driving route since walking is not restricted by one-way streets, turn restrictions, and so on.

If the end user wants walking directions to the final destination from a specified position that is not along one of the road segments represented by a road segment data entity included in one of the solution walking routes that had already been calculated, the walking instructions function 466 requests the walking route calculation function 350 to calculate a new walking route to the final destination from the specified position. The walking route calculation function 350 may access the geographic database 140 to obtain the road segment data entities 222 necessary to determine the new solution walking route. As before, the walking route calculation function 350 uses the walking criteria 380 so that only road segments that are pedestrian-usable are used in the new solution walking route. When the walking route calculation function 350 calculates a new walking solution route upon a request from the walking instructions function 466, a walking threshold is not used since it is assumed that the end user wants the walking route information regardless of the distance. However, when providing the walking directions, the walking instructions function 466 still provides data indicating the walking distance to the final destination so that the end user has this information for evaluation purposes.

These walking directions may be similar to the maneuvering directions provided to the end user to drive to the final destination, or alternatively, the walking directions may be more detailed and include different types of information. The walking directions may indicate a total walking distance to the final destination. The walking directions may also include a textual description of the route to follow to walk from the parking location to the final destination. These walking directions may also include the direction to walk, the names of the road segments along the walking route, an identification of each cross street at each intersection, which streets to cross at intersections, which direction to proceed at intersections, address ranges along the road segments, points of interest along the way, which side of the street to walking on, and so on. All this information is available from the road segment data entities in the solution walking route to the destination or from the geographic database.

The walking directions can be provided in various formats. According to one format, the walking directions are provided as text on the display screen (129(D) of FIG. 1) of the user interface. If the walking directions require more than one screen full of data, the walking directions may be provided on multiple screens that are presented one at a time to the end user. The walking directions may also be provided audibly using the speakers (129(S) in FIG. 1) of the user interface. The walking directions may also be provided visually on one or more maps graphically presented on the display screen (129(D) in FIG. 1).

In an alternative embodiment, the navigation system provides the walking instructions as a print out on a sheet of paper (if the navigation system has printing capability). In another alternative illustrated in connection with FIG. 1, the navigation system 110 transfers the walking directions to a portable electronic device 600 that the end user can carry with him/her after he/she leaves the vehicle. Suitable portable devices include a personal computer, a personal digital assistant, a PalmPilot®-type of device, or a wireless telephone. To provide for transferring data about the walking route to a portable device 600, the navigation system 100 may include appropriate hardware and software, such as a data port and cabling, a wireless data port 604, an IR data port, and so on. In another alternative, the navigation system 110 may include a portable portion that is removable from the vehicle. According to this latter embodiment, the walking instructions to the final destination are stored in a memory of the removable portable portion of the navigation system. In another alternative, the entire navigation system may be portable and removable from the vehicle so that end user can have the walking directions after departing the vehicle.

In a further alternative embodiment, the in-vehicle navigation system transmits to a portable electronic device not only data about a walking route to the final destination from the parking location but also additional data. These additional data include data identifying the location at which the vehicle has been parked and data about road segments around the location at which the vehicle has been parked and the location of the final destination. After these data are transmitted into the portable electronic device, the end user can remove the portable electronic device from the vehicle and carry it with him/her. The portable electronic device includes a display or other type of user interface. Using the data transmitted into the portable electronic device from the navigation system, the end user may not only review the walking directions to the final destination, as calculated by the in-vehicle navigation system, but also can review information about road segments around the parking location and the final destination. This enables the end user to depart from the walking route, if desired. For example, the end user may wish to visits several shops around the location at which the vehicle has been parked. The data about the road segments around the parking location enable the end user to walk between the various locations. The data about the road segments also enables the end user to find a pedestrian-usable route back to the location at which the vehicle has been parked. If the portable electronic device has a positioning system, the device can display the end-user's position and show the end user the shortest pedestrian-usable route back to his/her vehicle.

B. ALTERNATIVE EMBODIMENTS (1). Augmented Database Embodiments

In the first embodiment described above, walking information is provided to an end user of a navigation program that also provides for vehicle route calculation and guidance. In the first embodiment described above, the navigation program uses a geographic database which is not necessarily specifically designed for providing walking instructions. In the first embodiment, walking criteria are used to make an assessment whether a road segment is pedestrian-usable using data used for vehicle route calculation purposes.

Alternative embodiments are described in connection with FIGS. 10 and 11. In these alternative embodiments, the geographic database includes data components in addition to those described above in connection with the first embodiment. These additional data components in the geographic database may be used in connection with the provision of walking routes in combination with driving routes. The navigation programming includes functions that use these additional data components.

In these alternative embodiments, the navigation system and navigation programming are similar to the systems and programming described above in connection with the first embodiment. As described in connection with the first embodiment, the navigation system and programming use a geographic database that includes data that describe segments of roads.

Figure 10:
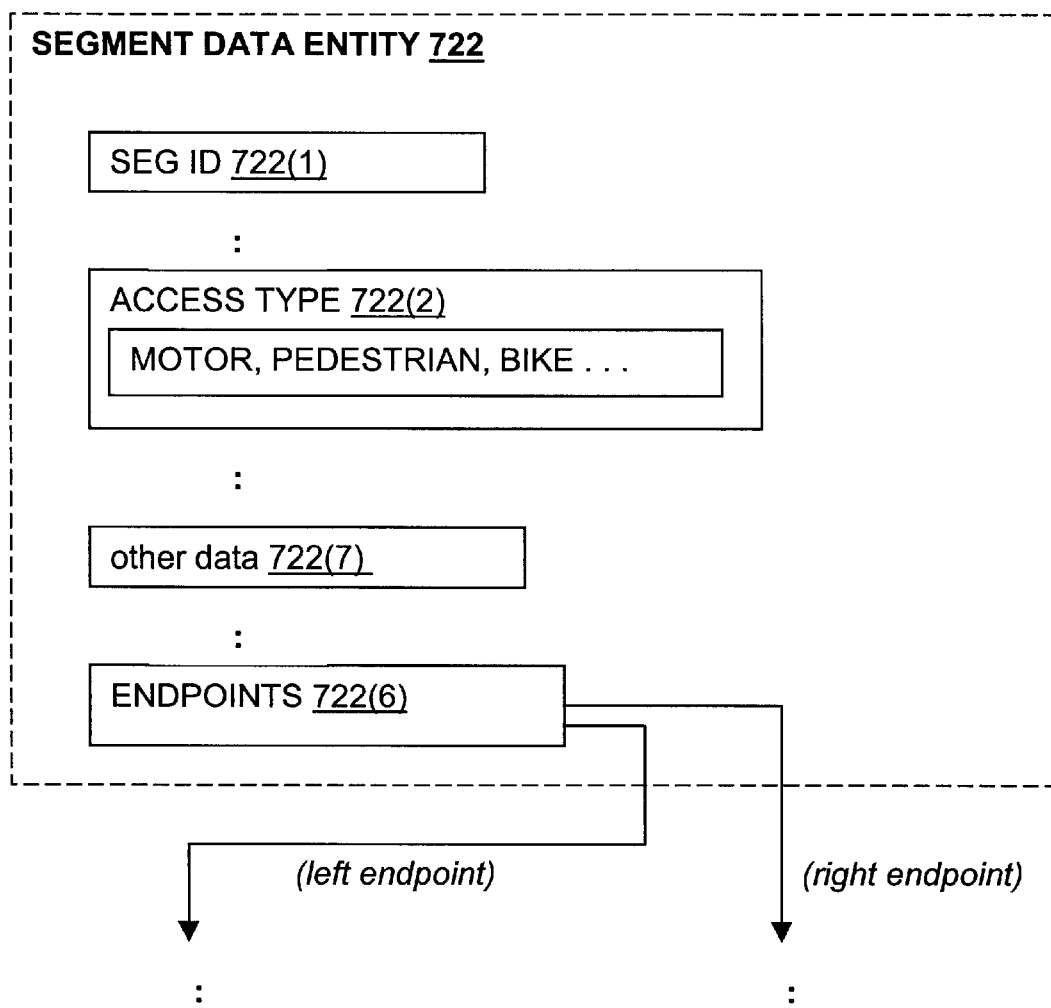
FIG. 10 is a block diagram illustrating components of a road segment data entity according to an alternative embodiment.

FIG. 10 shows data components associated with a road segment data entity 722 in accordance with a first of these alternative embodiments. In addition to the components shown in FIG. 10, the road segment data entity 722 may include (or be associated with) some or all of the same data and/or attributes as the road segment data entity 222 shown in FIG. 2. For example, the road segment data entity 722 in FIG. 10 may include data that indicates the direction of travel permitted on the represented road segment, data that indicates the speed of travel on the represented road segment, data indicating whether the represented road segment is part of a controlled access road, ramp, toll road, bridge, etc., data that indicates the rank of the represented road segment, data providing the geographic coordinates of the endpoints of the represented road segment, data indicating what, if any, turn restrictions exist at each of the endpoints of the represented road segment, and so on. (These attributes are shown in FIG. 2 and not shown again in FIG. 10.)

In FIG. 10, the road segment data entity 722 includes or is associated with an access type attribute 722(2). The access type attribute 722(2) includes an indication of the types of means of conveyance permitted on the road segment represented by the data entity 722. The access types include "motorized" and "pedestrian." Other access types may be defined, such as "public transportation" and "bicycle." The access type attribute may include types of means of conveyance in addition to these. The access type attribute may include more than one of these types of means of conveyance depending upon the types of means of conveyance permitted along the represented road segment. For example, the road segment data entity 722 may include both "motorized" and "pedestrian" in the access type attribute 722(3). This means that the represented road segment may be used by motorized vehicles and pedestrians, but not bicycles. (If a "public transportation" access type is defined and available, it means that the road segment is served by public transportation.)

When using this type of road segment data entity, the walking route generation function (366 in FIG. 5) uses the access type attribute 722(2) to determine pedestrian usable solution routes. According to one embodiment, the access type attribute 722(2) is used in place of the walking criteria (380 in FIG. 5). When the access type attribute 722(2) (or similar data) is available in the geographic database, it may be used as the only walking criterion test by the walking route generation function (366 in FIG. 5). The other walking criteria tests, e.g., "avoid controlled access roads," etc., may be omitted. An advantage of using the access type attribute 722(2) instead of the other walking criteria (380 in FIG. 5) is that the access type attribute 722(2) may provide more specific information about the suitability of a road segment for access by pedestrians. For example, some road segments, which otherwise would meet the walking criteria (380 in FIG. 5) for pedestrian-usability, may still not be pedestrian usable. For example, a road segment, which is not be part of a controlled access a road, a ramp, or a rank 4 road, may not have a sidewalk or shoulder. The access type attribute 722(2) included in the road segment data entity representing such a road segment would not indicate that such a road segment was "pedestrian" usable and the walking route calculation function (350 in FIG. 5) would not use such a road segment in a solution walking route.

In another alternative embodiment, the access type attribute 722(2) can be used in combination with the other walking criteria 380 specified above in FIG. 5.

In one alternative embodiment of a geographic database that includes access type data attributes associated with road segment data entities, all the road segment data entities in the geographic database represent road segments upon which vehicle traffic is permitted. (In such a case, the access type attribute need not separately indicate "motor" since all road segments would be assumed to permit motorized vehicle traffic.) In another alternative embodiment of the geographic database that includes access type data attributes associated with road segment data entities, some of the road segment data entities in the geographic database represent road segments upon which vehicle traffic is permitted and others of the road segment data entities represent road segments, paths, walkways, tunnels, bridges, overpasses, stairways, etc., upon which vehicle traffic is not permitted, but pedestrian and/or bicycle traffic is permitted.

Figure 11:
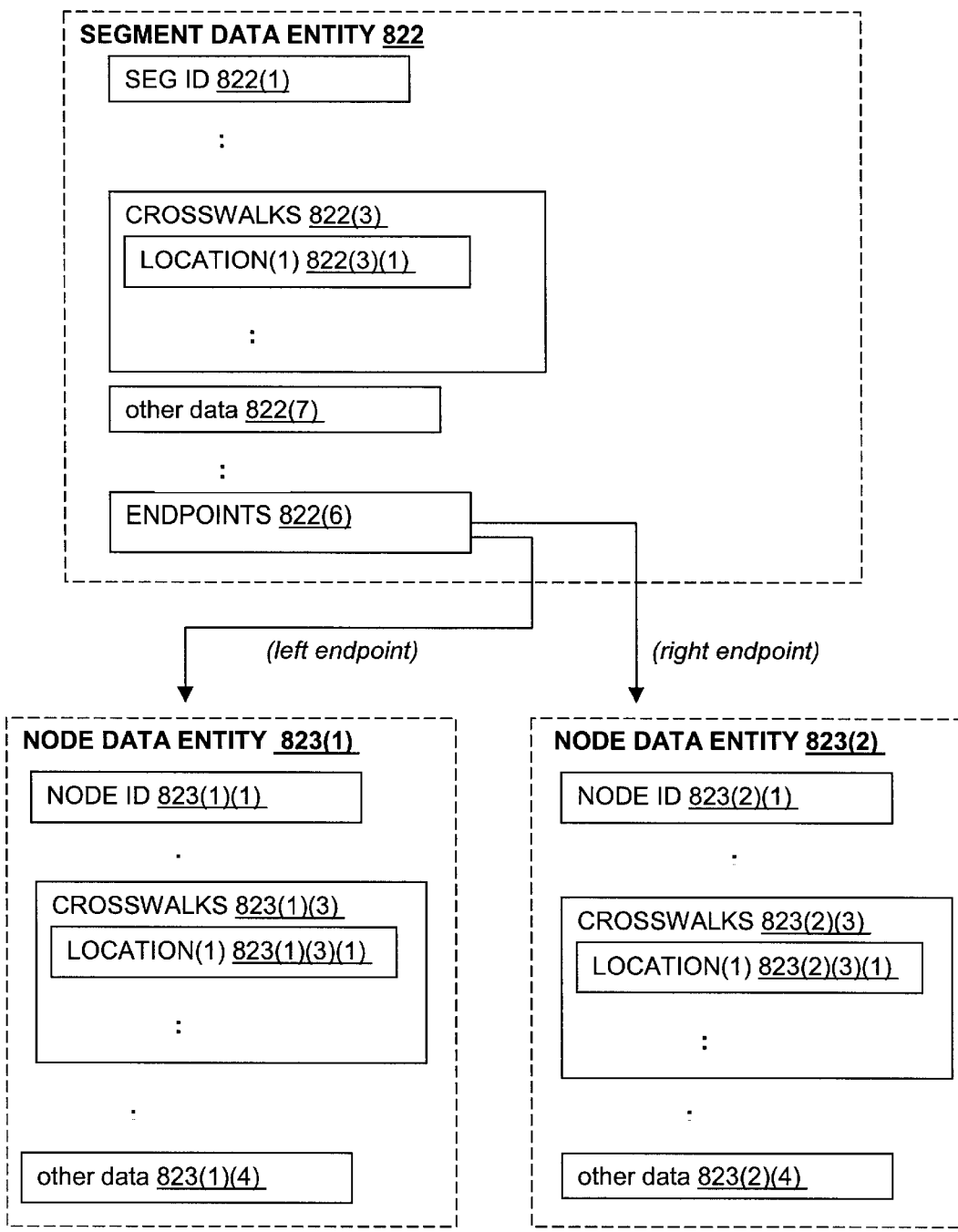
FIG. 11 is a block diagram illustrating components of a road segment data entity according to another alternative embodiment.

FIG. 11 shows some of the data components of a road segment 822 in another alternative embodiment of a geographic database used to provide walking information in combination with driving route calculation and guidance. Like the embodiment shown in FIG. 10, the road segment data entity 822 shown in FIG. 11 may include additional data components and/or attributes, such as the data components shown in FIG. 2. The embodiment shown in FIG. 11 can also include the access type data attribute feature shown in FIG. 10.

In the embodiment of FIG. 11, the road segment data entity 822 includes or is associated with information that indicates the presence and location of pedestrian crosswalks. This information may be included as an attribute 822(3) of the road segment data entity 822. Alternatively, the information may be included as an attribute of the node data entities 823(1) and 823(2) that represent the endpoints of the road segment represented by the road segment data entity 822. Alternatively, crosswalk information may be associated with both the road segment data entities and the node data entities.

The crosswalk information associated with a road segment data entity may include crosswalk location data 822(3)(1) that indicates the locations along the length of a represented road segment at which a pedestrian cross walk exists. There may be more than one crosswalk associated with each road segment. The crosswalk location data 822(2)(1) may indicate that a crosswalk is located at the endpoint of the represented road segment. The crosswalk location data 823(1)(3) and 823(2)(3) associated with a node data entity 823 may include data that indicates which of the road segments that meet at the location represented by the node data entity have pedestrian crosswalks. There may be more than one crosswalk associated with each node data entity.

The crosswalk data 822(3), 823(1)(3), and 823(2)(3) may be used by the walking route generation function 366 and/or the walking instructions function 466. The walking route generation function 366 can use the data about the locations of crosswalks to determine a walking route to the final destination. The walking instructions function 466 can include the information about the locations of crosswalks when providing the end user with walking directions to the final destination.

In further embodiments, the data entities that represent road segments and nodes can include information about additional features that may be relevant to pedestrian travel. These kinds of features include road barriers, fences, lane dividers, sidewalks, flights of stairs, and so on.

(2). Route Calculation to Parking Areas

In another alternative embodiment, the geographic database identifies parking areas, including parking garages and/or areas in which there is on-street parking. In this alternative, when an end user requests calculation of a route to a desired destination, the navigation programming provides the end user with the option of having a driving route calculated to a location around the desired destination at which parking may be found. If the end user chooses to be directed to a parking area around the desired destination, all the parking areas around the desired destination are identified. The walking threshold may be used to define how large an area around the desired destination should be searched for parking areas. All the parking areas within the walking threshold are identified and the walking route calculation function calculates walking routes from each of these identified parking areas to the destination. The end user is presented with a list on the display (129(D) of FIG. 1) showing all the available parking areas within the walking threshold of the desired destination. The walking distance of each may also be provided in the list. The available parking areas on the list may be ranked by the walking distance of each to the final destination, e.g., least distance to greatest distance. The list may also include the cost of parking at each of these parking areas, if such information is available. Using the information in this displayed list, the end user may then choose one of the parking areas. The driving route calculation function then calculates a driving route to the selected parking area. The end user is also provided with walking directions to the final destination from the selected parking area.

In an alternative mode of operation of the previously described embodiment, the driving route calculation function automatically selects the parking area that is the least walking distance to the final destination. To perform this function, the navigation programming includes a program function or routine that receives the walking route information from the walking route calculation function, automatically compares the computed walking distances from each of the parking areas around the final destination, selects the parking area that is the least walking distance from the final destination, and outputs this selected parking area to the driving route calculation function in order that a driving route be calculated to it.

In yet another alternative mode of operation, the navigation programming includes a function that optimizes combinations of driving and walking routes so that the overall combination provides the best route based upon a selectable cost factor. According to this alternative, assume that there are a plurality parking facilities around a destination. For each of these parking facilities, a combination driving/walking route is calculated. For each driving/walking route combination, the driving portion is the driving route from an origin location to the location of the parking facility. The walking portion of each driving/walking route combination is the walking route from the location of the parking facility to the destination location. A cost factor is associated with each portion. (A cost factor may be the time to travel, although it could be some other measurable quantity, such as distance.) The costs of the driving portion and the walking portion are summed for each driving/walking route combination. These summed costs are compared and the combination driving/walking route that has the best overall cost is selected.

In the embodiments described above in which the navigation system identifies parking areas around a desired destination, time-of-day and day-of-week parking restrictions relating to on-street parking are taken into account when developing a list of parking areas within the walking threshold of the final destination.

In another alternative embodiment, the geographic database includes point-of-interest data entities. The point-of-interest data entities represent named locations such as hotels, stadiums, car dealerships, car rental agencies, health clubs, restaurants, hospitals, gas stations, and so on. In this further embodiment, each point-of-interest data entity includes attributes that identify associated parking facilities, if any. These associated parking facilities may also be represented by point-of-interest data entities in the geographic database. Thus, the point-of-interest and its associated parking facility may be related to each other in a parent-child relationship in the geographic database. In a first point-of-interest data entity that represents a point-of-interest that has an associated parking facility represented by a second point-of-interest data entity, a data attribute of the first point-of-interest data entity points to the point-of-interest data entity that represents the associated parking facility. Using this system, a point-of-interest can be associated with one or more parking facilities and a parking facility may be associated with one or more points-of-interest.

In another alternative embodiment, the point-of-interest data entities that represent certain types of points-of-interest, such as restaurants, hotels, etc., may include attributes that indicate whether or not the point-of-interest includes parking at the point of interest. Then, when the end user operates the navigation system to request that a route be calculated to the point-of-interest, the information about the availability of parking at the point-of-interest can be used to determine whether walking routes from locations around the point-of-interest should be calculated. For example, if the point-of-interest does not have parking, the end user can be presented with a message on the display screen (129(D) of FIG. 1) indicating that the point-of-interest does not have parking and providing the end user with the option of having walking routes to the final destination calculated from locations having parking within the walking threshold around the point-of-interest. (Additionally, the point-of-interest data entity can include an attribute that indicates whether valet service is available at the point-of-interest.)

In another alternative embodiment, as the destination is approached by a vehicle, the navigation system in the vehicle obtains information about the availability of parking at parking facilities around the destination location. According to this alternative embodiment, parking facilities (or points-of-interest that have parking facilities, such as shopping malls) may transmit or broadcast current information about the availability of parking. Alternatively, the navigation system may transmit a message to identified parking facilities requesting replies about the availability of parking. The information from the parking facilities is received in the navigation system using a wireless communication system. This information from the parking facilities about the availability of parking is used in conjunction with the information about the walking distance to the final destination. The navigation system calculates a driving route to the parking facility that has the shortest walking distance to the final destination and that also has available parking.

(3). Further Alternative Embodiments

The disclosed embodiments can be implemented on various systems and platforms. In addition to in-vehicle navigation systems, embodiments can be provided on personal computers, including desktop computers and portable computers. These kinds of embodiments may or may not include a positioning system. If the system upon which an embodiment is installed does not include a positioning system, the position of the end user may be entered manually. Embodiments of the disclosed system and/or programming may also be provided on networks, including wireless networks and the Internet. Embodiments may also be included on handheld computer devices, such as personal digital assistants, telephones, pagers, PalmPilot®-types of devices, and so on. In addition, embodiments may be included on special purpose electronic devices, such as personal navigation systems.

There are various ways and methods of operation that a navigation system can use to provide the end user with information about a walking route to a final destination in combination with providing route guidance for driving to the final destination. In one of the embodiments described above, one or more walking routes were calculated backwards from the final destination out along pedestrian-usable road segments. Instead of calculating these walking routes in advance, another way that the navigation system can provide information to the end user about available walking routes is to calculate and update the straight-line distance (i.e., "as-the-crow-flies") to the final destination from the current position of the vehicle as the vehicle is being driven toward the final destination. Whenever this distance is within the specified walking threshold, a walking route is calculated to the final destination from the position of the vehicle, in the manner described above. Calculation of a walking route can be done relatively quickly under these circumstances because the walking threshold is a relatively short distance. Using this method, the end user can drive anywhere he/she wants (on or off the original route) while knowing how far the walking route distance would be from the current position of the vehicle. The walking distance would not be calculated if the vehicle leaves the threshold distance area.

Another embodiment provides for walking directions in the event of a vehicle breakdown or emergency situation. According to this embodiment, the end user of an in-vehicle navigation system requests walking directions from a present vehicle location to the nearest point of interest of a selected type, such as a service station, a police station, a hospital, and so on. This provides an alternative to calling for assistance in emergencies. The navigation system searches the geographic database and provides the desired information to the end user along with walking directions to the desired destination of the selected type. As mentioned before, when providing walking directions, the navigation system uses walking criteria. Using walking criteria to determine a walking route to the nearest location of the desired type may provide a shorter route than if the navigation system calculated a vehicle route to a point of interest of the desired type. For example, the navigation system may indicate that a point of interest of the desired type was 100 feet back along a one-way street.

According to another embodiment, the navigation application program can provide or incorporate routes that use public transportation in combination with driving and/or walking. According to this embodiment, routes that use public transportation in combination with driving can be calculated in the same or similar manner as routes that use walking in combination with driving. For example, the route calculation program first calculates a driving route to a parking space or parking lot from which the final destination is accessible by public transportation. Then, the route guidance program provides the end user with driving instructions to the parking space or lot and then provides instructions for taking public transportation from the parking space or lot to the final destination. In order to calculate routes that use public transportation, the navigation system is provided with access to data about the locations at which public transportation can be accessed, hours of operation, schedules, fees, and so on. This information may be included in a geographic database installed in the vehicle or made available to the navigation system in the vehicle over a wireless communications link from a central location. In further alternative embodiments, the navigation application program can calculate and provide guidance for following routes that include driving, public transportation and walking.

When public transportation is available for some or all of the distance to a final destination, the walking threshold may not be used for that portion of the route that is traveled by public transportation. When public transportation is available for some or all of a route to a final destination, the travel time using public transportation may be compared to the travel time using a private vehicle. Further, if real time traffic information is available, this information can also be used to compare travel times between public transportation and travel by private vehicle.

It is intended that the foregoing detailed description be regarded as illustrative rather than limiting and that it is understood that the following claims including all equivalents are intended to define the scope of the invention.

We claim:

1. A method implemented with a navigation system located in a vehicle for providing route guidance to a desired destination, the method comprising the steps of:
   after calculating a first route to be driven toward the desired destination with the navigation system using a geographic database that includes data representing segments of roads in a geographic area, calculating a second route using the geographic database, wherein said second route provides for reaching the desired destination by foot; and
   transmitting data that indicate directions for walking said second route from the navigation system into a portable electronic device.

2. The method of claim 1 further comprising the step of:
   using a set of criteria when calculating said second route, wherein said set of criteria is used to assess whether represented road segments are usable by pedestrians.

3. The method of claim 2 wherein said set of criteria eliminates from consideration road segments that are part of controlled access roads and road segments that are part of ramps to controlled access roads.

4. The method of claim 2 wherein said set of criteria permits calculation of said second route with travel along one way streets opposite from a permitted direction of vehicular travel.

5. The method of claim 1 wherein the data are used to indicate a walking distance to the desired destination from a current position of the vehicle.

6. The method of claim 1 further comprising the step of:
   when calculating said second route, using a walking threshold distance wherein said second route does not exceed in length said walking threshold distance.

7. The method of claim 6 wherein said walking threshold distance is configurable by the end user.

8. The method of claim 1 wherein said step of calculating a second route comprises the steps of:
   evaluating road segment data entities from said geographic database, wherein said road segment data entities represent road segments leading to the desired destination and wherein said step of evaluating comprises assessing attributes associated with each road segment data entity for suitability for pedestrian travel; and
   forming a list of road segment data entities, wherein the road segment data entities on said list represent a plurality of road segments that form a continuous route leading to said desired destination.

9. The method of claim 8 wherein at least one of said attributes includes an indication whether pedestrian travel is permitted along the road segment.

10. The method of claim 1 wherein said first route to be driven toward the desired destination is directed to a parking area near the desired destination.

11. The method of claim 1 wherein said data are transmitted into said portable electronic device wirelessly.

12. The method of claim 1 wherein said data are transmitted into said portable electronic device via a cable.

13. The method of claim 1 wherein said portable electronic device comprises a personal digital assistant.

14. The method of claim 1 wherein said portable electronic device comprises a wireless telephone.

15. The method of claim 1 further comprising:
   with said portable electronic device, providing the end user with guidance for following the second route to the destination.

16. The method of claim 15 wherein the guidance is provided audibly.

17. A method implemented with a navigation system located in a vehicle, wherein the navigation system uses a geographic database to calculate driving routes to destinations selected by a user and provide the user with guidance for driving to the destinations, the method comprising:

upon occurrence of an emergency situation, receiving a request from the user for walking directions from a current location of the vehicle to a facility of a type at which assistance for dealing with said emergency situation can be obtained;

accessing the geographic database to determine a location of a facility of the type at which assistance for dealing with said emergency situation can be obtained; and determining a walking route from said current location to the location of the facility of the type at which assistance for dealing with said emergency situation can be obtained, wherein said walking route is determined using the geographic database used to calculate driving routes and wherein said walking route is determined using walking criteria to select roads for said walking route that are appropriate for use by pedestrians.

18. A geographic database stored on a computer readable medium comprising:

road segment data entities that represent segments of roads upon which persons can travel in a geographic area including segments of roads upon which only vehicular traffic is permitted, segments of roads upon which only non-vehicular traffic is permitted, and segments of roads upon which both vehicular traffic and non-vehicular traffic are permitted, wherein said road segment data entities are associated with data indicating types of means of conveyance permitted to travel upon the represented road segments, and wherein said types of means of conveyance indicated by said data include motorized vehicles, pedestrians, and bicycles.

19. The geographic database of claim 18 wherein the types of means of conveyance further include public transportation.

20. The geographic database of claim 18 further comprising data relevant to pedestrian travel, wherein said data relevant to pedestrian travel indicate locations of road barriers, fences, lane dividers, sidewalks, flights of stairs, and lane dividers.

* * * * *